Oct. 19, 1943.                C. L. A. WYND ET AL                2,332,038
                                PHOTOGRAPHIC ELEMENT
                                Filed Sept. 23, 1941

Clarence L. A. Wynd
Gerould T. Lane
INVENTORS

BY
ATTORNEYS

Patented Oct. 19, 1943

2,332,038

UNITED STATES PATENT OFFICE 2,332,038

PHOTOGRAPHIC ELEMENT

Clarence L. A. Wynd, and Gerould T. Lane, Rochester, N. Y., assignors to Eastman Kodak Company, Rochester, N. Y., a corporation of New Jersey Application September 23, 1941, Serial No. 411,968

4 Claims. (Cl. 95—8)

This invention relates to the reproduction of engineering drawings and the like, and particularly to the photographic reproduction of such drawings when using opaque materials throughout.

In the making of metal templates or patterns for industrial production it has been customary to prepare the original drawings which were then redrawn to scale on the work material by hand. This time-consuming and laborious method of preparing the templates or patterns (usually metal) was subject to errors and recently has been replaced to some extent by photographic copying and reproduction. One such process, disclosed in application Serial No. 407,959, filed Aug. 22, 1941, by the present inventors, and which matured on December 1, 1942, as Patent No. 2,303,942, makes use of a drawing delineated by fluorescent material and contact printed on a photographic layer carried by the work material. The resulting print of the drawing is, of course, a mirror image of the original and for convenience will be referred to herein as a negative. When the print is not a mirror image but is a duplicate it will be referred to as a positive without regard to whether it is black on white or white on black.

For obvious reasons it is highly desirable to be able to produce on the metal work sheets several positive duplicates of the original drawing or selected portions of it. This is made possible by the present invention which provides a complete process of making photographic reproductions via the negative, positive method and using opaque material throughout.

According to the preferred embodiment of the invention, the original drawing is made on a layer of fluorescent material carried by an X-ray permeable, rigid support, such as aluminum or plywood. This drawing is placed in contact with a photographic layer carried by an X-ray permeable support and exposed by activating the fluorescent layer with X-rays which may be directed through either support. Now, in order that the resulting negative print may be similarly printed to provide a positive, a fluorescent layer is provided under its photographic layer and a removable screening layer is preferably provided between the two so that, when the photographic layer is exposed and developed and the screening layer removed, there results a negative equivalent of the original drawing. This negative may be printed on a photographic layer by activating the fluorescent layer of the negative with X-rays in the same general way the negative was made from the original.

In addition to making a negative on a fluorescent layer, the original may also be employed to print negative template material. Thus, by having both a positive and a negative from which contact prints can be made, it is simplicity itself to provide the exactly symmetrical templates so often required in the type of manufacturing for which such templates are best adapted. For example, if the original drawing represents the right front door of an automobile, the negative fluorescent print will represent the left front door, and the templates for the right and left doors will be made by contact printing the fluorescent negative and the fluorescent original, respectively.

Instead of using fluorescent material any suitable luminescent material may be employed. This material may then be activated with the proper radiation, such as ultra-violet light, cathode rays, X-rays, etc. It will be understood that when the activating radiation is not transmitted by the support, the exposure will be made by phosphorescent light. Also, the sensitive photographic layer carried by the element of my invention may be exposed as desired, whether by means of a luminescent drawing or by means of ordinary light when the drawing to be printed thereon is carried by a transparent support, such as plate glass.

Figure 1:
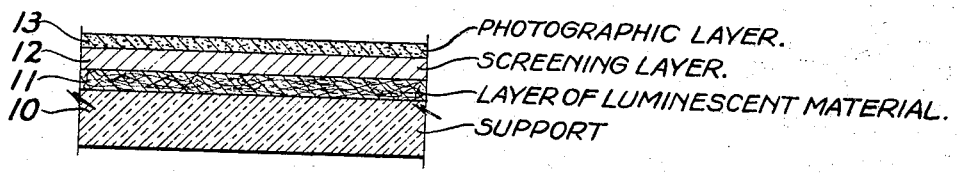
Fig. 1 is a cross-sectional view of a light-sensitive element made in accordance with the invention.
Figure 2:
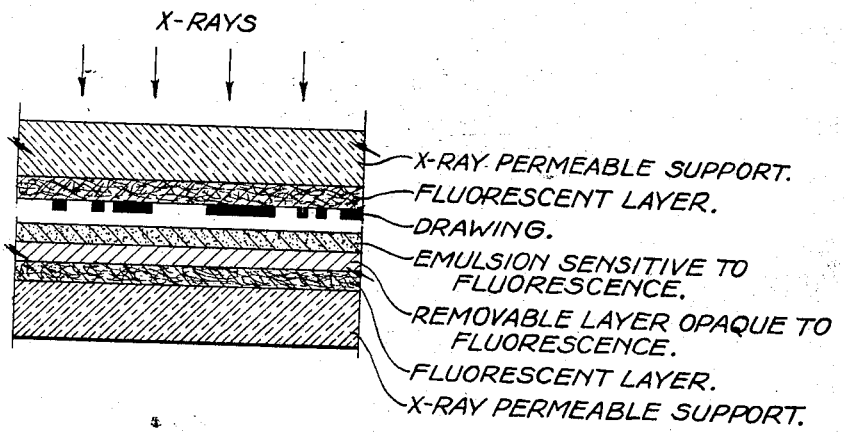
Fig. 2 is a sectional view showing this element being given an epipolized printing exposure.
Figure 3:
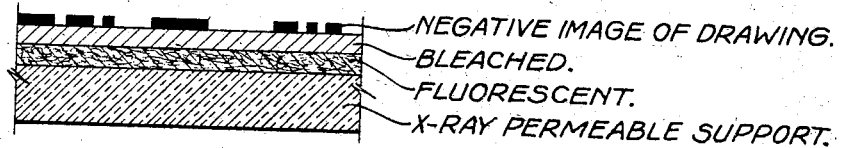
Fig. 3 is a sectional view showing a photographic record made in accordance with the invention.

In Fig. 1 an opaque support 10 is provided with a plurality of layers, the first of which is a layer 11 of luminescent material, the next layer 12 is a screening layer adapted to shield the outer light-sensitive layer 13 from the luminescence of the layer 11. The luminescent material of layer 11 may be calcium tungstate incorporated in a water-resistant medium, such as a cellulose ester solution. The screening layer 12 should be capable of being made transparent and preferably is one which may be decolorized either by action of a photographic processing bath or a separate bleaching bath. A satisfactory screening layer 12 may be made of manganese dioxide or a non-wandering dye suspended in a water-permeable medium, such as gelatin, far hydrolyzed cellulose esters, or resinous materials of like properties, in order that this layer 12 may be decolorized by the aqueous processing or bleaching baths.

A photographic layer 13 is preferably of the process type and may be either a gelatino silver halide emulsion or one prepared from suitably prepared cellulose esters or resins. These may be adapted to be spread or brushed onto the base material and, of course, suitable subbing layers of known types should be used to secure satisfactory adhesion between the various layers.

In view of the fact that, in the industrial art for which the present invention is particularly suitable, the sheets upon which the drawings are made and reproduced range in size up to six feet wide and twenty feet long, it is not a simple matter to apply the photographic layer 13, and for this reason we prefer to make use of the transfer film described and claimed in an application, Serial No. 397,093, filed June 7, 1941, by G. T. Lane, one of the present inventors, by which an unexposed sensitized layer is applied to the large metal plate.

Although at the present time it is preferred to practice the invention as above described, the invention has been practiced in other ways to obtain the same desirable results. For instance, the fluorescent layer upon which the drawing is made can be prepared so that it transmits a relatively small proportion of the X-rays employed to activate it. Thus, the screening layer of the photographic element may be omitted because its underlying fluorescent layer will not be sufficiently activated to produce an intolerable fogging exposure. A similar result can be obtained by carefully choosing the X-ray exposure, both as to hardness and time, best adapted for the fluorescent material employed and the sensitivity of the emulsion to be exposed.

When the process of the present invention is practiced using phosphorescent light for copying the original drawing, a screening layer between the sensitive layer 13 and the underlying luminescent layer 11 is unnecessary, and the print may be made on a photographic layer directly overlying the luminescent layer.

It will be evident from the above description that the present invention makes it possible and practical to make a photographic copy on a rigid opaque support, which copy may be printed onto another photographic layer carried by an opaque support. It will be understood that the usefulness of the element of the present invention is not limited to processes in which it is printed from a drawing or printed onto a photographic layer carried by an opaque support.

What we claim and desire to secure by Letters Patent of the United States is:

1. An element for use in a photographic process comprising an opaque support, a layer of luminescent material on said support, a photographic emulsion overlying the luminescent material, and a screening layer opaque to the light emitted by the luminescent layer between the photographic emulsion and the luminescent material said screening layer being decolorized by photographic baths.

2. A photographic element comprising an opaque support permeable to X-rays, a layer of a material which fluoresces actinic light when activated by X-rays, an easily decolorized screening layer opaque to actinic light, and an outer layer sensitive to actinic light.

3. A photographic element comprising a support, a layer on the support which is capable of being rendered luminescent under suitable activation, a sensitive layer overlying said layer, and a water-permeable layer between the sensitive layer and the first named layer and containing a substance opaque to the luminescent light emitted by the first named layer, said substance being removable in aqueous baths.

4. A photographic element as defined in claim 3 wherein the water-permeable medium is gelatin and the opaque substance is manganese dioxide.

CLARENCE L. A. WYND.
GEROULD T. LANE.